United States Patent [19]

Platt

[11] 3,860,172
[45] Jan. 14, 1975

[54] AUTOMATIC IRRIGATION APPARATUS
[76] Inventor: Ethan A. Platt, 341 Andrews St., Livermore, Calif. 94550
[22] Filed: June 14, 1972
[21] Appl. No.: 262,728

[52] U.S. Cl. .............................................. 239/65
[51] Int. Cl... A01g 25/00, A01g 27/00, B05b 17/04
[58] Field of Search .................. 239/65, 67, 68, 66; 137/67; 222/17, 20

[56] References Cited
UNITED STATES PATENTS
2,684,077   7/1954   Shaffer................................. 239/65
FOREIGN PATENTS OR APPLICATIONS
908,235   8/1945   France................................. 239/65

Primary Examiner—Lloyd L. King
Attorney, Agent, or Firm—C. Michael Zimmerman, Esq.

[57] ABSTRACT

The irrigation apparatus described is especially adapted for use in irrigating small agricultural plots and home gardens with ditches. The apparatus includes an elongated bag of a flexible, water impervious material adapted to collect a generally continuous flow of water until a predetermined volume of water is stored therein. An end of the bag is provided with a discharge arrangement in the form of a support platform which normally maintains the end of the bag at a selected elevation representative of the desired predetermined volume. The positioning of the platform is controlled by a weight biasing means which is overcome by the static pressure of the water within the bag when it reaches the predetermined volume so that the bag end is lowered and the full volume of water therein is discharged into an irrigation ditch system. The predetermined volume of water is thus automatically discharged into the irrigation system at time intervals dependent upon the rate of flow of water into the bag.

8 Claims, 4 Drawing Figures 3,860,172

AUTOMATIC IRRIGATION APPARATUS

BACKGROUND OF THE INVENTION

This invention relates to irrigation apparatus and, more particularly, to such an apparatus for automatically discharging a predetermined volume of water into an irrigation system.

In agriculture, the majority of crops, especially produce crops, are watered by conveying the water to the plants by means of an irrigation ditch system. The irrigation ditch system typically includes a main distribution ditch across the "head" of an agricultural field which feeds subsidiary ditches extending throughout the field, such as between the rows of the plants. Water flow through the ditches is controlled by small, temporary earth dams and the like. During the growing season in a typical commercial operation, an employee has the responsibility of periodically rotating the water between various sets of the subsidiary irrigating ditches to thus periodically "soak" the ground around the roots of the individual plants.

One of the primary advantages of irrigating a crop with a ditch irrigation system is that with proper location of the ditches, water is conveyed directly to the roots of the plants it is desired to water. This is a particularly important advantage in the growing of so-called cash crops or produce, as opposed to grain crops, in which the individual plants are somewhat spaced apart and larger. In contrast, the watering of a cash crop or the like with a sprinkling system, which indiscriminately spreads water over a full area, results in a consequent wastage of water. Moreover, because of evaporation and the fact that a full area must necessarily be covered with water by a sprinkling system, as a practical matter a sprinkling system cannot provide the same degree of plant root soaking as is obtainable with a ditch irrigation system.

Although the advantages of irrigating with ditches is recognized, this method has generally not been adopted for watering home gardens and other small planted areas. One primary reason for this is that a source for the relatively large volume of water needed for effective ditch irrigation is not, as a rule, available in the vicinity of most home gardens. Another is that the manual labor and time required to control the water flow of a conventional ditch irrigation system is neither attractive nor warranted for smaller plots, especially if the plot is a garden maintained primarily as a hobby. For these reasons, owners of smaller plots, home gardeners and the like generally turn to sprinkling to water their gardens.

SUMMARY OF THE INVENTION

The present invention provides an irrigation apparatus especially adapted for use in irrigating small agricultural plots and home gardens with ditches without requiring either the separate source of high volumetric flow or the labor and time associated with conventional ditch irrigation. To these ends, the apparatus of the invention includes means for collecting a generally large, predetermined volume of water and means for periodically discharging such water automatically into an irrigation system, such as a system of irrigation ditches. Because the apparatus includes means for collecting a volume of water, a separate source providing a high volumetric flow is not needed. The automatic discharge of the water periodically into the irrigation system eliminates the necessity for otherwise controlling the flow into the ditches. That is, the apparatus can be set to discharge the desired volume of water into the ditch system at preselected time intervals dependent upon the frequency with which it is desired that the crop served by the ditch system be watered.

Most desirably, the means for automatically discharging the volume of water into the irrigation ditches does so in response to the volume of water in the collecting means reaching the desired, predetermined volume. With such an arrangement, one can control the frequency with which the water is discharged into the ditch system merely by controlling the rate at which water flows into the collecting means, such as via a simple control valve on a tap water outlet. More particularly, the rate of flow through the valve can be adjusted so as to correspondingly vary the rate of water buildup in the collecting means and, hence, the time interval between discharge of the water into the irrigation ditches.

The invention includes other features and advantages which will be described or will become clear from the following more detailed description of preferred embodiments of the invention.

BRIEF DESCRIPTION OF THE DRAWINGS

With reference to the accompanying two sheets of drawings.

DETAILED DESCRIPTION OF PREFERRED EMBODIMENTS

Figure 1:
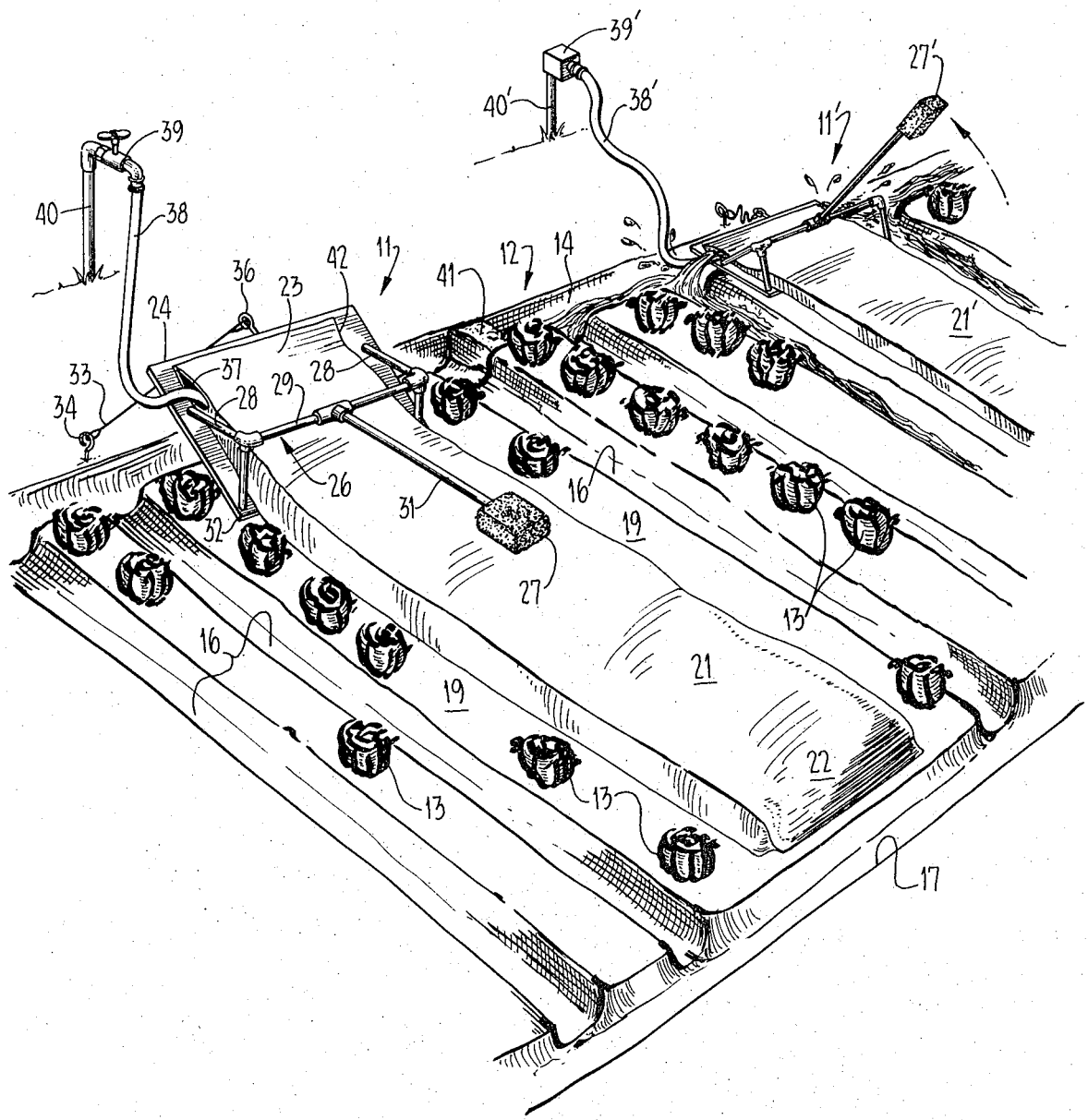
FIG. 1 is an isometric view illustrating a typical installation of a preferred embodiment of the invention in a small home garden.
Figure 2:
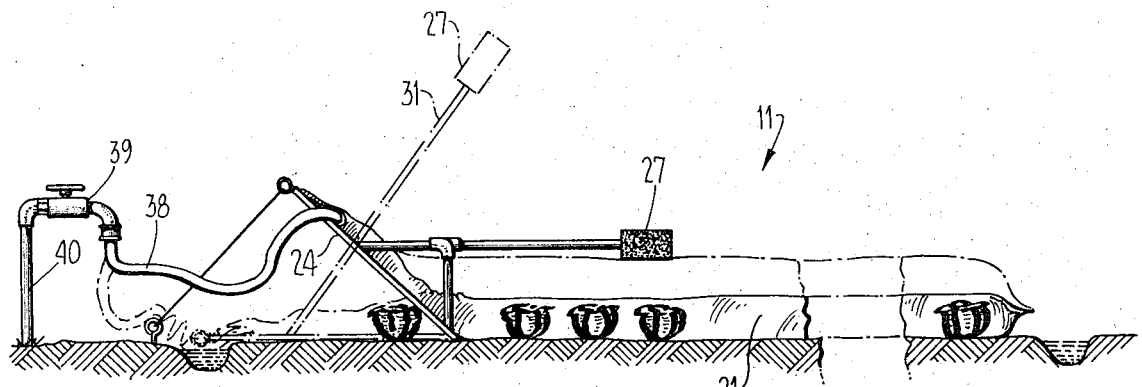
FIG. 2 is a broken side view of the preferred embodiment of the invention of FIG. 1 installed in a garden, illustrating phantom water discharge condition of the same.
Figure 3:
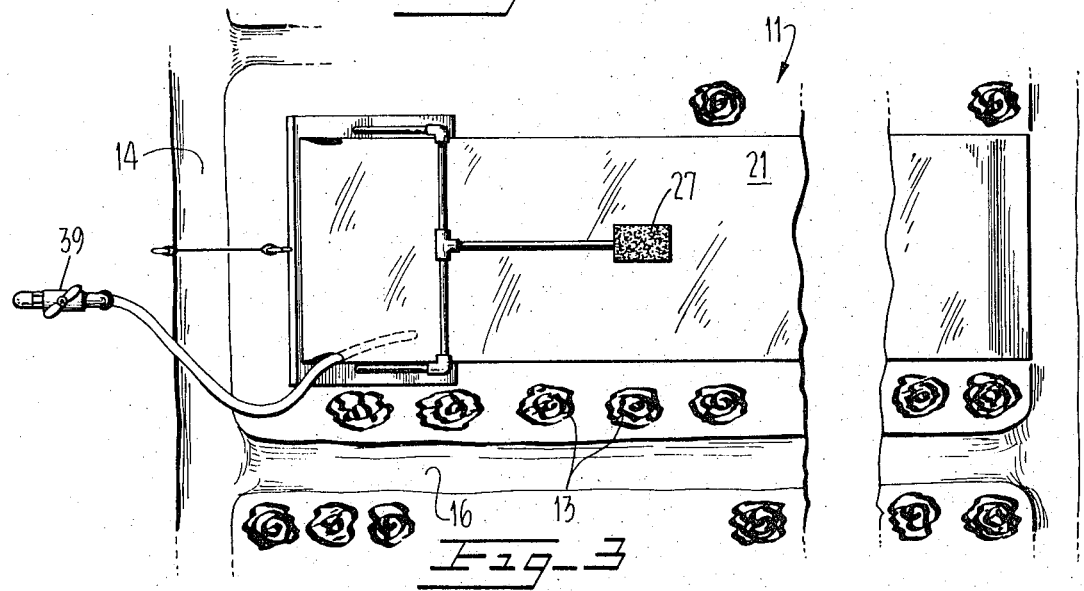
FIG. 3 is a broken plan view of the preferred embodiment of the invention.

With reference to the accompanying drawings, FIGS. 1 through 3 show a preferred embodiment of the invention, generally referred to by the reference numeral 11, installed in a home garden or the like having a ditch irrigation system 12 for watering the individual plants 13 of the garden. The irrigation ditch system includes a main distribution ditch 14 which traverses the garden plot along the end of the plant rows, and a plurality of subsidiary ditches 16 which extend adjacent each plant row. Water introduced into the main distribution ditch 14 will flow down each of the subsidiary ditches 16 and seep into the ground adjacent the plants. In this manner, the roots of the individual plants will be soaked as is desired. A drainage ditch 17 is provided along the bottom of the subsidiary ditches to drain any overflow of water from the area.

As is illustrated, the irrigation apparatus 11 of the invention is positioned in the garden between a pair of spaced apart plant rows 19. Such apparatus includes means for collecting a predetermined volume of water. More particularly, a relatively large bag 21 of a flexible, water impervious material, such as heavy polyvinyl or polyvinylchloride sheet, is positioned lengthwise between the plant rows 19. The lower end 22 of such bag is sealed closed, whereas its upper end 23 includes a rocking support arrangement for automatically discharging the water in the bag into the main distribution ditch 14 upon a desired predetermined volume thereof being reached within the bag.

The rocking support arrangement includes a support platform 24 which extends beneath the bag from a position adjacent the edge of the end 23 thereof to a position inwardly of such end. Moreover, it further includes biasing means for normally maintaining the platform 24 in an orientation which supports the end 23 of the bag at a selected elevation. That is, a framework 25 projects from the upper surface of platform 24 to cantilever a weight 27 over the bag 21 toward its midportion. Such framework includes a pair of triangular supports 28 which project upward from the platform adjacent opposite sides of the bag 21. A cross bar 29 is secured between the apexes of the supports 29 to extend transversely over the bag 21. A boom 31 projects centrally from the cross bar 29 over the bag to act as direct support for the weight 27. As is illustrated, the framework 26 is simply assemblable from lengths of standard pipe and suitable pipe joints.

It will be seen that with the above construction, the weight 27 tends to angularly rotate the platform 24 about its inner edge 32 in a clockwise direction as viewed in the figures. Means are provided to limit such rotation so that the weight 27 normally maintains the platform 24 in the position shown. That is, a suitable length of guide rope 33 is secured between a ground stake 34 and an eye hook 36 which projects centrally from the upper edge of the platform 24. Thus, the weight is constrained to cant the platform angularly upwards from its inner edge to the degree illustrated, and thereby raising the bag end 23 to the desired elevation. It should be noted that although the bag rope 33 limits clockwise rotation of the platform 24, it does not hinder counter-clockwise rotation of such platform toward a position flat on the ground.

Means are provided for directing generally continuous flow of water into the bag so that the amount of water therein periodically reaches the desired, predetermined volume. More particularly, one side of the bag end 23 is provided with an inlet in the form of an opening 37 which is adapted to receive the discharge end of a water hose 38 or the like. Hose 38 is connected through a valve 39 to a piped in source of water, represented by upstanding pipe 40.

The valve 39 is most desirably of the flow metering type, such as the standard tap water type illustrated. With such a valve, one can control the rate at which the bag 21 fills and hence reaches the desired predetermined volume, merely by controlling the rate at which water is allowed to flow through hose 38 into such bag. Thus, one can set the valve 39 to provide continuous flow at a rate which will provide the desired interval between the times the bag 21 reaches the desired volume.

It is the construction of the rocking support which is responsible for it automatically discharging the water collected in the bag 21 upon the same reaching the desired volume. More particularly, it will be appreciated that as the bag 21 fills, the level of the water in the end 23 thereof will rise vertically along the platform 24. This means that the total static pressure of water within the bag on the platform will also increase, which static pressure is in a direction resisting the bias placed on the platform by the weight 27. Upon the water level within the bag end 23 reaching an elevation resulting in the total amount of static pressure within such end overcoming the bias provided by the weight 27, the platform over balances to a position flat on the ground so that the water therein can flow into the main ditch 14. For this purpose, the bag end 23 is provided not only with the opening 37, but also with an outlet opening 42 on the side thereof opposite such opening 37. Both of such openings 37 and 42 serve as discharge openings.

Upon the bias of the weight 27 being overcome by the static pressure of the water in the end 23 of the bag, substantially all of the water within the bag will be discharged, thereby providing the high volumetric flow rate required for effective ditch irrigation. In this connection, it should be noted that because of the cantilevered arrangement by which the weight 27 is secured to the platform, upon the platform being lowered the weight will be rotated angularly upward to the position illustrated for the apparatus 11' in FIG. 1 and in phantom in FIG. 2. The result is that the vertical force component provided by the weight and tending to cant the platform 24 angularly upward will be reduced. The water flowing out of the bag 24 is thus able to maintain the platform in the lowered position until such time as the bag is substantially empty. The full volume of water within the bag 21 is therefore discharged all at one time into the main ditch 14. This results in the desired amount of water running into the subsidiary ditches and soaking the roots of the plants.

The rate of flow of water into the bag 21 is adjusted so that time required to fill the bag 21 to the predetermined volume is the same as the time desired between different waterings. Once this adjustment is made, the irrigation system will be automatically filled with water at the prescribed intervals without requiring further effort on the part of the grower.

As is illustrated in FIG. 1, a plurality of irrigation apparatuses of the invention can be placed in one plot at spaced apart locations to handle different sets of the subsidiary ditches 16. In this connection, earth dams, such as the dam 41 in the main irrigation ditch 14, can be used to separate the respective areas to be irrigated by each of the apparatus.

The frequency with which it is desired to water plants is generally determine by atmospheric conditions. It is therefore sometimes desirable to be able to vary the frequency with which any particular installation of the present invention discharges its predetermined volume of water into an irrigation system. This is particularly true in those geographical areas in which one can expect a somewhat wide variation in temperature during the growing season. The present invention further includes means to automatically provide such variation. More particulary, this is simply accomplished by varying the rate of flow of water into the bag in direct proportion to changes in the ambient temperature. Thus, merely providing a temperature responsive valve to control the flow rate into the bag 21 accordingly, will provide the desired variation. Such a valve 39' is schematically illustrated in combination with the bag 21' of the apparatus 11' shown in FIG. 1. In all other respects the apparatus 11' is identical to the apparatus 11.

Figure 4:
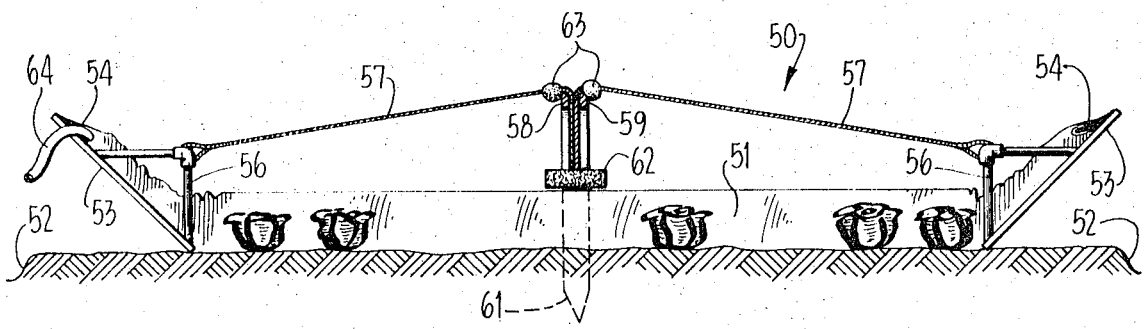
FIG. 4 is a side elevational view of another preferred embodiment of the invention.

FIG. 4 illustrates another embodiment of the invention generally referred to by the reference numeral 50, which is designed to discharge the predetermined volume of water from both of its ends into main distribution ditches. More particularly, the bag 51 of the apparatus 50 is elongated and positioned between a pair of spaced apart irrigation ditches 52 with its opposite ends 53 adjacent respective ones of such ditches. Each of the ends 53 includes a discharge opening 54 through which water within such bag is dischargeable into the irrigation ditch associated with such end.

The discharge valve arrangement associated with each of the ends 53 is substantially the same as that described for the embodiments of FIGS. 1–3. It differs only in that the biasing means for normally maintaining each of the platforms canted angularly upward is combined into one arrangement. More particularly, instead of a weight being cantilevered outward over the bag from the support framework 56 at each end of the bag, a guide rope 57 extends from each of such frameworks to a position centrally of the bag where it is threaded through an aperture 58 extending downwardly through a cross member 59 supported horizontally above the bag by vertical stakes 51 (one of which is shown) on opposite sides of such bag. The free end of both guide ropes 57 is secured to a suitable weight 62 which acts to maintain the platforms in their canted positions. In this connection, it should be noted that the means provided in this embodiment for preventing the platforms 53 from being rotated by the weight 62 about their lower edges beyond the positions illustrated takes the form of stop members 63 suitably positioned on each of the guide ropes 57. Such members are sized so as not to fit through the aperture 58 and thereby limit the downward movement of the weight 62.

The rate at which this embodiment of the invention discharges into the ditches 52 is also controllable by appropriately adjusting the rate at which water flows into the bag. A hose 64 is illustrated entering into one end of such bag for this purpose. Even though this embodiment is capable of discharging water at two different locations, only one source of water is needed to fill the bag and control the time interval between discharges.

While the invention has been described in connection with several preferred embodiments thereof, it will be appreciated by those skilled in the art that various changes and modifications can be made without departing from its spirit. It is therefore intended that the coverage be limited only by the terms of the claims and their equivalents.

I claim:

1. Irrigation apparatus for automatically discharging a predetermined volume of water into an irrigation system, comprising means for collecting said predetermined volume of water; means for automatically discharging said water periodically from said collection means into said irrigation system in response to the volume of water in said collecting means reaching said predetermined volume; means for directing a generally continuous flow of water into said water collecting means to periodically provide said predetermined volume of water in said collecting means for discharging to said irrigation system at time intervals generally dependent on the rate of flow of said water into said collecting means, said means for directing a generally continuous flow of water into said water collecting means including an inlet into said collecting means adapted to receive a hose for conveying said generally continuous flow of water thereto.

2. The irrigation apparatus of claim 1 wherein said means for directing a continuous flow of water into said water collecting means further includes a valve means for metering a predetermined, continuous flow of water into a hose for conveyance to said inlet for said collecting means.

3. The irrigation apparatus of claim 2 wherein said valve means is responsive to ambient temperature changes by varying the flow rate into said hose directly with respect to changes in said ambient temperature.

4. Irrigation apparatus for automatically discharging a predetermined volume of water into an irrigation system comprising, means for collecting said predetermined volume of water; means for automatically discharging said water periodically from said collection means into said irrigation system in response to the volume of water in said collecting means reaching said predetermined volume; and means for directing a generally continuous flow of water into said water collecting means to periodically provide said predetermined volume of water in said collecting means for discharging to said irrigation system at time intervals generally dependent on the rate of flow of said water into said collecting means, said means responsive to the collection of said predetermined volume of water by discharging the same into said irrigation system being so responsive to the static pressure provided in said collecting means upon said predetermined volume of water being reached, and said collecting means being in the form of a water bag of a flexible, water impervious material which is adapted for positioning adjacent an irrigation ditch.

5. The irrigation apparatus of claim 4 wherein an end of said bag is provided with at least one discharge opening through which water collected within said bag is dischargeable into said irrigation ditch; and said discharge means includes a support platform for said bag end, and biasing means for normally maintaining said platform in an orientation supporting said end of said bag at a selected elevation, which biasing means is overcomeable by a selected amount of static water pressure in said bag caused by the water level within said end reaching an elevation representative of said bag having said predetermined volume of water to reorient said platform to lower said end of said bag for discharge of said predetermined volume of water from said bag.

6. The irrigation apparatus of claim 5 wherein said support platform for said end of said bag extends beneath said bag at said end to a position inwardly of said end, and said biasing means for normally maintaining said platform in said orientation supporting said end of said bag at said selected elevation includes a weight cantilevered from said platform over said bag to cant said platform angularly upward from its inner edge to thereby raise said bag end.

7. The irrigation apparatus of claim 4 wherein said flexible bag is elongated for positioning between a pair of spaced apart irrigation ditches with its opposite ends adjacent respective ones of said ditches, each end of said bag includes a discharge opening through which water is dischargeable into the irrigation ditch by which such end is respectively positioned, and discharge means is associated with each of said bag ends responsive to static pressure in said bag upon said predetermined volume of water being reached in said bag by discharging the water in the same into the irrigation ditch associated therewith.

8. The irrigation apparatus of claim 7 wherein each of said discharge means includes a support platform for the bag end with which is associated, biasing means for normally maintaining said platform in an orientation supporting said end of said bag at a selected elevation, which biasing means is overcomeable by a selected amount of static water pressure in said bag caused by the water level within said end reaching an elevation representative of said bag having said predetermined volume of water to reorient said platform to lower said end of said bag supported for the discharge of said predetermined volume of water from said bag.

* * * * *